Figure 5:
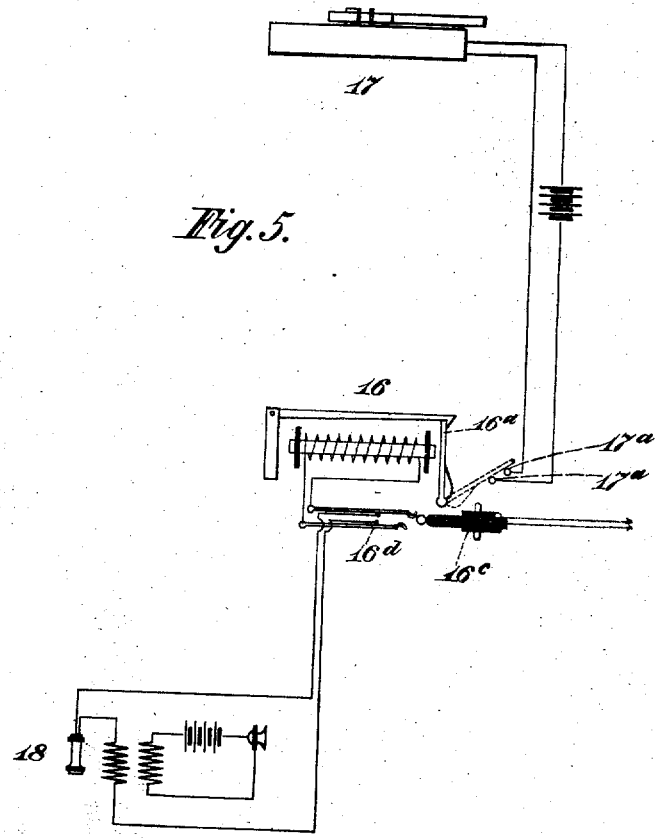

No. 853,373. PATENTED MAY 14, 1907.
A. R. POLLOCK.
REGISTERING SYSTEM FOR TELEPHONE EXCHANGES.
APPLICATION FILED AUG. 29, 1906.
2 SHEETS—SHEET 1.
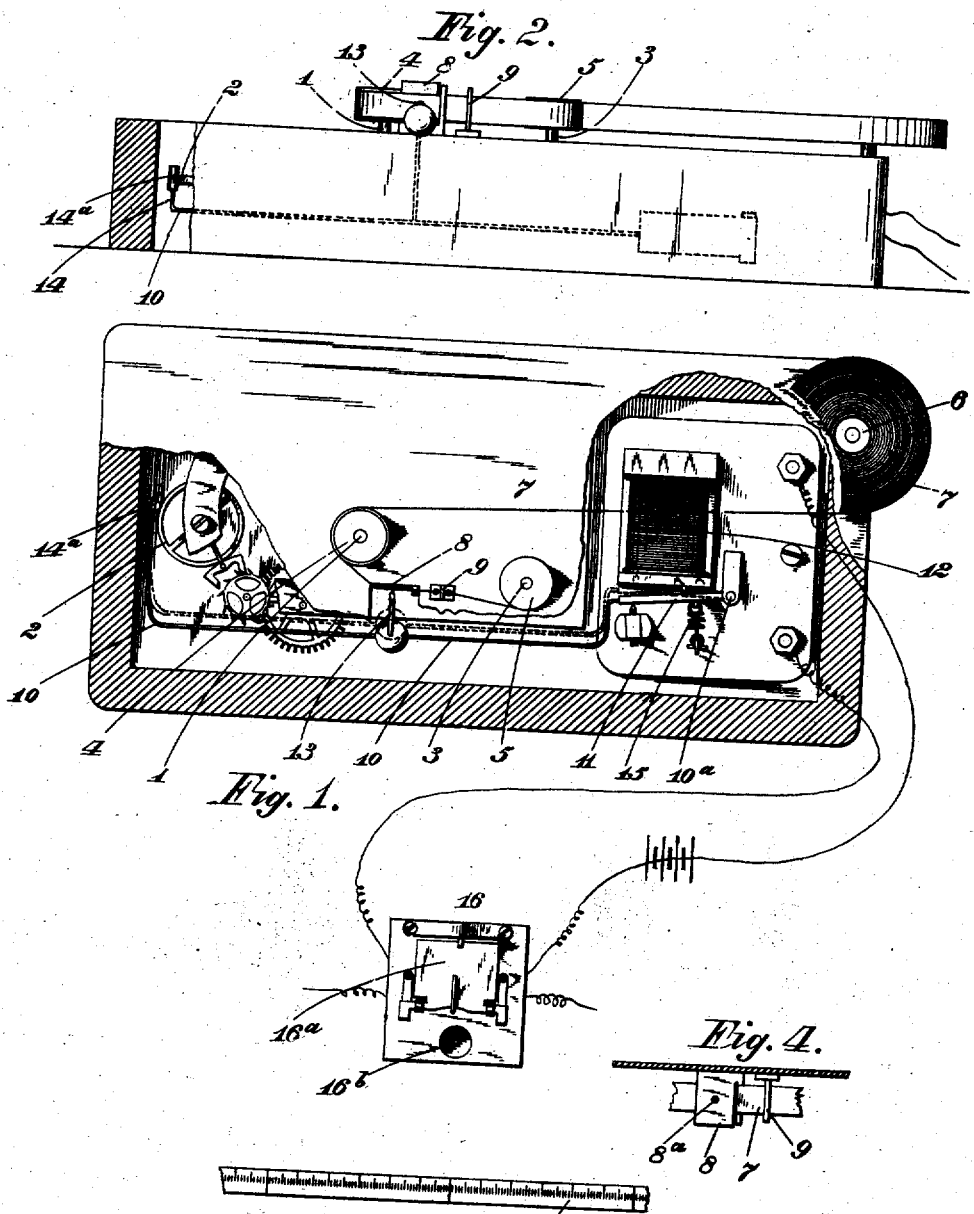
Witnesses
Benj. Finckel
Alice B. Cook.
Inventor
Arthur R. Pollock
By Finckel & Finckel
his Attorneys.

No. 853,373. PATENTED MAY 14, 1907.
A. R. POLLOCK.
REGISTERING SYSTEM FOR TELEPHONE EXCHANGES.
APPLICATION FILED AUG. 29, 1906.

2 SHEETS—SHEET 2.

Witnesses
Benjamin Finckel
Alice B. Cook.

Inventor
Arthur R. Pollock
by Finckel & Finckel
his Attorneys.

UNITED STATES PATENT OFFICE.

ARTHUR R. POLLOCK, OF PIQUA, OHIO.

REGISTERING SYSTEM FOR TELEPHONE-EXCHANGES.

No. 853,373.  Specification of Letters Patent.  Patented May 14, 1907.

Application filed August 29, 1906. Serial No. 332,414.

*To all whom it may concern:*

Be it known that I, ARTHUR R. POLLOCK, a citizen of the United States, residing at Piqua, in the county of Miami and State of Ohio, have invented a certain new and useful Improvement in Registering Systems for Telephone-Exchanges, of which the following is a specification.

The object of this invention is to provide means for use in telephone exchanges whereby the time elapsing between the moment a telephone subscriber's call is received and the moment the operator makes the connection with the telephone called may be measured and recorded.

The invention is embodied in the construction shown and described, but I do not confine myself in its embodiment to the particular instance illustrated.

In the accompanying drawings—Figure 1 is a plan view of my apparatus with a portion of the case broken out and associated with a switch board annunciator drop; Fig. 2 is an edge view of my apparatus, looking upward, as viewed in Fig. 1; Fig. 3 is a plan of a fraction of the tape that can be used; Fig. 4 is a plan view of a plate under which the tape runs. Fig. 5 is a diagrammatic view, partially conventional, illustrating my device in connection with telephone instruments and exchange station devices.

In the views 1 designates the seconds-hand shaft of an ordinary clock mechanism, and 2 is the usual balance wheel that controls the operation of said mechanism.

3 is a motor-operated winding shaft.

On the shaft 1 is secured to turn with it a spool 4 having a friction surface adapted to prevent slipping of the tape thereon, and secured on the shaft 3 to turn with it is a tape winding spool 5.

The character 6 designates a spool containing a supply of tape 7. The tape 7 is run over the spool 4 under a plate 8 having a perforation 8ª. The tape is also passed through a guide 9, and is attached to the spool 5. The spool 5 draws upon and winds up the tape, but the spool 4 controls the speed of the tape and makes said speed uniform— that is to say, the speed of the tape is equal to the speed of the circumference of the spool 4 because the wheel 5 can only wind up the tape 7 as fast as the positively rotated wheel 4 will permit it. The power driving the wheel 5 is such that it suffices to wind up the tape merely or is not such as will draw on the tape sufficiently to cause any slipping of the tape on the wheel 4 or to rupture the tape. It is convenient that one rotation of the spool 4 shall represent one minute of time, and that a measured portion of the tape shall be equal to the circumference of the spool. For this latter purpose the tape can be divided by marks representing minutes, and these divisions further divided into portions representing seconds of time. The tape is preferably of paper or other suitable flexible material adapted to be easily punctured.

10 designates a rod conveniently of wire. This rod is pivoted at one end, as seen at 10ª, and carries an armature 11 adapted to be actuated by an electro-magnet 12. Near its middle the rod carries a perforator 13 arranged under or opposite the hole 8ª in the plate 8. The other end of the rod 10 carries a finger 14 provided with a small frictional device, conveniently a piece of rubber tubing 14ª. The finger or the frictional device 14ª thereon is adapted to be brought into and removed from contact with the balance wheel 2 of the time mechanism so as to interrupt its motion or permit it to move.

15 designates a spring attached to the armature and to a fixed point on the base piece containing the electro-magnet 12, said spring tending to retract the armature from the magnet, and also tending to draw the arm 14 into position to stop the motion of the balance wheel.

16 designates an ordinary annunciator drop containing a hinged shutter 16ª, such as is used in the ordinary telephone exchange, and into the hole 16ᵇ of which the usual plug is inserted to effect the connection between calling and called parties.

The operation is as follows: When a subscriber calls in the shutter 16ª drops and closes a circuit through the electro-magnet 12. This operates the armature 11, the perforator 13, and the finger 14 to release the balance wheel 2. The release of the balance wheel permits the operation of the time mechanism and consequently the rotation of the spool 4. The arrangement of the perforator is such that it will strike the tape and rebound therefrom just prior to or contemporaneously with the release of the time mechanism, so that the point of the perforator shall not tear or interfere with the movement of the tape. When the operator inserts the connecting plug the shutter 16ª is by the plug restored to normal position, as is usual, and thus cuts out the circuit from the electro-magnet 12, whereupon the spring 15 draws the finger 14 into position to stop the movement of the balance wheel and the operation of the time mechanism. At the next call the tape is again perforated, and the space between the perforations indicates the time that elapsed between the first call and the time of connection of that call.

In Fig. 5 my apparatus is indicated generally at 17, the switch-board or exchange station apparatus at 16, and a telephone and transmitter apparatus at 18. The switch-board apparatus and telephone instruments are of the usual and ordinary construction and are connected in the usual and ordinary way. The hinged drop shutter or annunciator 16ª, when a subscriber signals the exchange, is released from its latched position and closes the local circuit of my apparatus (including the magnet 12, see Fig. 1) at suitable terminals or contacts 17ª, 17ª. When the exchange station operator inserts the switching plug 16ᶜ in the spring jack 16ᵈ the drop shutter or annunciator is restored to its latched position by the pressure of the plug on it, as usual, and the local circuit through the magnet 12 (see Fig. 1) is opened.

Among the advantages of this device are that it provides a permanent record of the time consumed by the operator in making connections and the number of calls received during specified periods. From this data waste, inattentiveness, or want of skill in the operators can be detected and remedied. It will be noted that the time mechanism is operated only during the interval between the call and the connection by the operator, and hence a small quantity of tape suffices for a considerable period of use.

What I claim and desire to secure by Letters Patent is:

1. In a telephone system, the combination with a telephone circuit and exchange station devices including a drop annunciator and a switching device, said annunciator being operated by the telephone circuit and said switching device, of apparatus comprising a motor for moving a record-receiving device, a time mechanism for controlling the movement of said device, and means for controlling the operation of said time mechanism including an electro-magnet circuit, electro-magnet and armature, the circuit of said electro-magnet being opened and closed by the operation of said annunciator, said motor being rendered operative by the closing of the electro-magnet circuit.

2. In a telephone system, apparatus of the kind described, comprising in combination, a motor for moving a record-receiving device, a time mechanism for controlling the movement of said record-receiving device by said motor, means for controlling the operation of said time mechanism, said means being operative by the use of a subscriber's telephone to put the time mechanism into operation and by the operator at the exchange to put said time mechanism out of operation.

3. In a telephone system, apparatus of the kind described, comprising in combination, a motor for moving a record-receiving device, a time mechanism for controlling the movement of the record-receiving device by said motor, means for controlling the operation of said time mechanism, said means operative by the use of a subscriber's telephone to put the time mechanism into operation and by the operator at the exchange to put said time mechanism out of operation, and a marker for said record receiving device operative when the time mechanism is put into operation.

4. In a telephone system, apparatus of the kind described, comprising in combination, a motor for moving a record-receiving device, a time mechanism for controlling the movement of the tape by said motor, said time mechanism including a balance-wheel, means for controlling the operation of said balance-wheel comprising a device adapted to be moved into and out of position to interfere with the operation of said balance-wheel, and an electro-magnet adapted to be included in a circuit of a telephone of the system when said telephone is used to control the operation of said device, and means for making a record on said record-receiving device.

ARTHUR R. POLLOCK.

Witnesses:
FRED McGONAGLE,
LEE KISER.